United States Patent
Blum et al.

(10) Patent No.: US 11,711,437 B1
(45) Date of Patent: *Jul. 25, 2023

(54) DISTRIBUTED TRANSMISSION OF MESSAGES IN A COMMUNICATION NETWORK WITH SELECTIVE MULTI-REGION REPLICATION

(71) Applicant: PubNub, Inc., San Francisco, CA (US)

(72) Inventors: Stephen L. Blum, San Francisco, CA (US); Jochen W. Roth, San Francisco, CA (US)

(73) Assignee: PUBNUB, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,332

(22) Filed: Mar. 10, 2022

Related U.S. Application Data (63) Continuation of application No. 17/183,687, filed on Feb. 24, 2021, now Pat. No. 11,323,538.

(60) Provisional application No. 62/988,604, filed on Mar. 12, 2020.

(51) Int. Cl.
| | | |
|---|---|---|
| *H04L 29/08* | (2006.01) | |
| *H04L 67/289* | (2022.01) | |
| *H04L 67/1095* | (2022.01) | |
| *H04L 67/1097* | (2022.01) | |
| *H04L 61/5069* | (2022.01) | |
| *H04L 61/5076* | (2022.01) | |
| *H04L 67/52* | (2022.01) | |

(52) U.S. Cl.
CPC ........ *H04L 67/289* (2013.01); *H04L 61/5069* (2022.05); *H04L 61/5076* (2022.05); *H04L 67/1095* (2013.01); *H04L 67/1097* (2013.01); *H04L 67/52* (2022.05)

(58) Field of Classification Search
CPC ... H04L 67/289; H04L 61/5076; H04L 67/52; H04L 61/5069; H04L 67/1095; H04L 67/1097
USPC ........................................................ 709/218
See application file for complete search history.

(56) References Cited

U.S. PATENT DOCUMENTS

| | | | |
|---|---|---|---|
| 9,063,951 B1 * | 6/2015 | Zhu ..................... | G06F 16/9574 |
| 9,955,444 B1 | 4/2018 | Blum et al. | |
| 9,965,640 B1 | 5/2018 | Blum et al. | |
| 10,691,820 B1 | 6/2020 | Blum et al. | |
| 11,323,538 B1 * | 5/2022 | Blum ..................... | H04L 67/55 |
| 2007/0233385 A1 * | 10/2007 | Dicke ..................... | H04L 67/34 |
| | | | 707/E17.11 |
| 2016/0069704 A1 * | 3/2016 | Park ..................... | G06F 3/0482 |
| | | | 701/532 |
| 2017/0193002 A1 * | 7/2017 | Shvachko ........... | G06F 16/1844 |

* cited by examiner

*Primary Examiner* — Jude Jean Gilles
(74) *Attorney, Agent, or Firm* — Fox Rothschild LLP (57) ABSTRACT

To distribute messages to subscribers that are located in multiple regions, a data center will receive messages that to be published to the subscribers. The data center will then perform a limited replication process to other data centers in other regions by accessing an interest map indicating additional data centers at which subscribers have recently expressed interest. The data center will transmit the messages to only that group of additional data centers for replication but not to other data centers at which no interest has been recently expressed.

20 Claims, 6 Drawing Sheets

|  | 12:00 | 12:05 | 12:10 | 12:15 | 12:20 |
|---|---|---|---|---|---|
| DC 1 Channel A | X | X | X | X | X |
| DC 1 Channel B | X | X | X | X | X |
| DC 1 Channel C | X |  | X | X | X |
| DC 2 Channel A | X |  |  |  |  |
| DC 2 Channel B |  |  |  |  |  |
| DC 2 Channel C | X | X | X | X | X |
| DC 3 Channel A | X | X | X | X | X |
| DC 3 Channel B | X | X | X | X |  |
| DC 3 Channel C |  | X | X | X | X |

FIG. 5A

|  | 12:05 | 12:10 | 12:15 | 12:20 | 12:25 |
|---|---|---|---|---|---|
| DC 1 Channel A | X | X | X | X | X |
| DC 1 Channel B | X | X | X | X |  |
| DC 1 Channel C |  | X | X | X |  |
| DC 2 Channel A |  |  |  |  |  |
| DC 2 Channel B |  |  |  |  | X |
| DC 2 Channel C | X | X | X | X | X |
| DC 3 Channel A | X | X | X | X | X |
| DC 3 Channel B | X | X | X |  |  |
| DC 3 Channel C | X | X | X | X | X |

DISTRIBUTED TRANSMISSION OF MESSAGES IN A COMMUNICATION NETWORK WITH SELECTIVE MULTI-REGION REPLICATION

RELATED APPLICATIONS AND CLAIM OF PRIORITY

This patent document is a continuation of U.S. patent application Ser. No. 17/183,687, filed Feb. 24, 2021, which in turn claims priority to U.S. Provisional Patent Application No. 62/988,604, filed Mar. 12, 2020. The disclosures of each priority application are fully incorporated into this document by reference.

BACKGROUND

The transmission of sequences of messages from publishers to subscribers across wide area communication networks is a key function of many modern communication systems. Video and audio streaming services, news feeds, and even video and audio conferencing services publish messages to client devices that subscribe to and receive the published messages. In many cases, subscribers may be geographically distributed across multiple regions of a nation, or even across multiple nations. This can create latency in message delivery, especially when messages must traverse multiple regions or countries from a publisher to reach a remote subscriber.

To address this issue of latency, systems are available to provide multi-region replication of messages. For example, U.S. Pat. No. 9,965,640 to Blum et al. discloses a message distribution system that replicates a collection of messages across multiple regional data centers. When any of the data centers receives a message for distribution from an authorized publisher, it transmits the message to each of the other data centers so that the collection of messages is immediately replicated among all of the data centers. When any data center determines that a subscriber is connected to it, that data center determines which messages in the data collection the subscriber is authorized to receive, and it automatically sends those messages to the subscriber. (The disclosure of U.S. Pat. No. 9,965,640 is fully incorporated into this document by reference.)

Systems such as that described above are very effective for reducing latency in multi-region message delivery. They also have the added benefit of providing an automatic fail-over if one of the data centers become unavailable, such as by going offline. However, as messages increase in volume, the replication of a full data set among multiple data centers does require an increased cost. In addition, some types of messages may contain content that is subject to different storage and access standards depending on the jurisdiction in which the data is published, stored or accessed. For example, data privacy laws may vary by jurisdiction, and some jurisdictions may prohibit the transmission of certain type of data outside of the jurisdiction.

Improved message delivery methods and systems are needed to address the technical issues described above. This document describes methods and systems that are directed to addressing the issues described above.

SUMMARY

In various embodiments, a system distributes messages to subscribers that are located in multiple regions. A first data center of the system receives messages that are to be published to multiple subscribers. The data center saves the messages in a data store along with, for each message. The data center performs a limited replication process by: (a) accessing an interest map indicating data centers with which subscribers are associated; and (b) transmitting the saved messages to those data centers with which the subscribers are associated as indicated by the interest map for replication, and not to other data centers that are not indicated by the interest map as being associated with the subscribers. The system also may perform the limited replication process for multiple channels.

In some embodiments, the first data center may periodically update the interest map. For each update in which one or more associations between subscribers and associated data centers have changed from a prior version of the interest map, the system may identify a new additional data center with which a subscriber has associated in the update but to which no subscriber was connected in the prior version, and it will then transmit the saved messages to the new additional data center. Alternatively, for each update in which one or more associations between subscribers and data centers has changed from a prior version of the interest map, the system may identify a data center with which a subscriber was associated in the prior version but with which no subscriber is associated in the update, and thereafter, when transmitting the saved messages to the group of additional data centers for replication, the system may exclude the identified data center from the replication.

In some embodiments, when generating the interest map, the system may generate the map as an array that includes, for each of multiple time periods, an indication of whether interest has been expressed for each channel in each time period. The indication may include, for example, a hashed or compressed representation of a tenant's channel name space. For each new time period, the system may add a new set of time series data to the interest map for the new time period and remove an oldest set of time series data from the interest map.

In some embodiments, the first data center may receive a request for interest map data from a second data center, and it may transmit a portion of the interest map to the second data center.

In some embodiments, when transmitting the saved messages, the system may perform a chatter reduction process that combines entries from multiple interest maps into a single Ethernet frame.

In some embodiments, when performing the limited replication process, before transmitting the saved messages the system may identify whether any of the data centers with which subscribers for the first channel are associated are data centers that are subject to a regional restriction. When transmitting the saved messages that are associated with the first channel, the system may only transmit the messages to data centers that are not subject to the regional restriction.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

Additional terms that are relevant to this disclosure will be defined at the end of this Detailed Description section.

Figure 1:
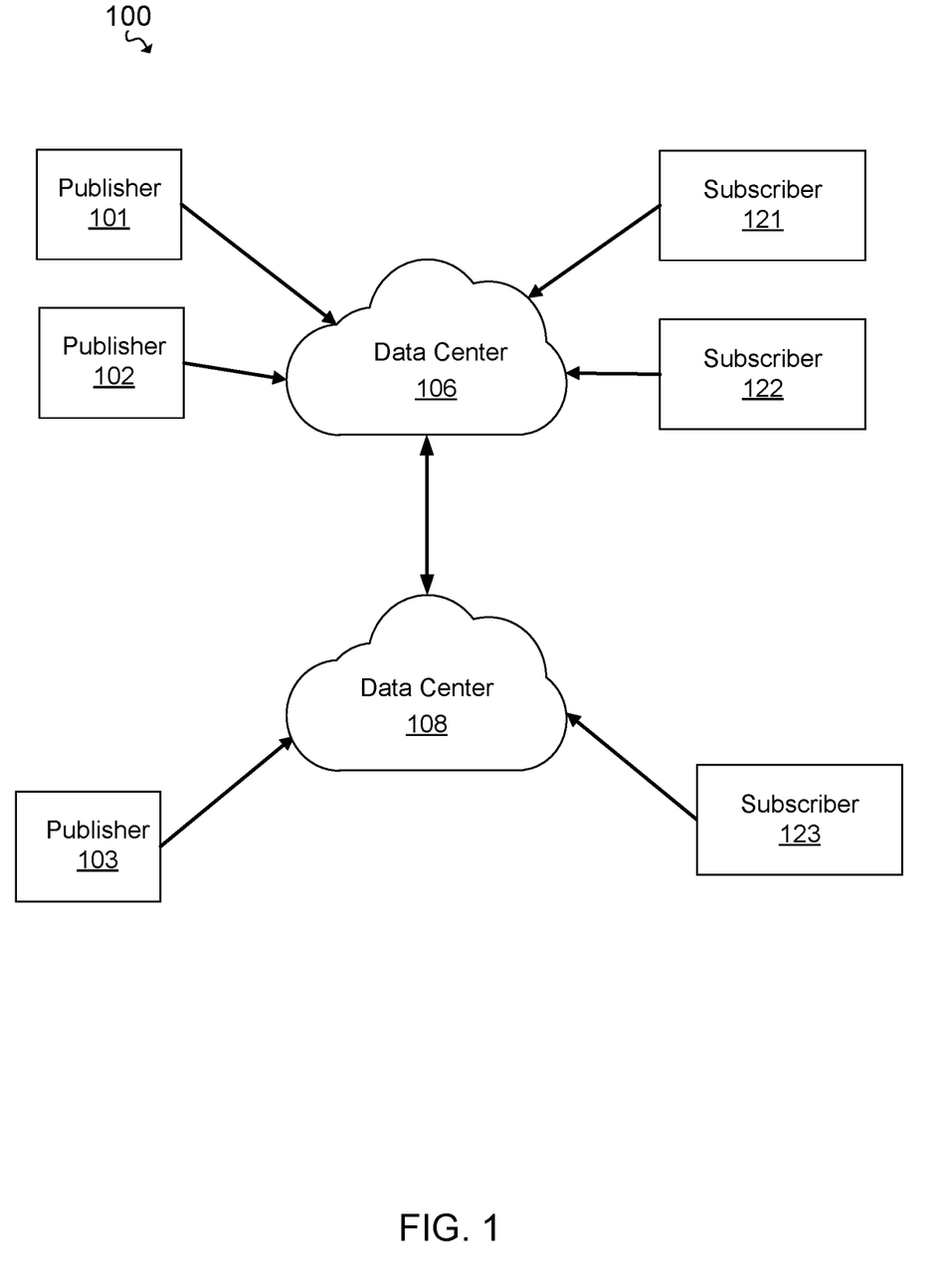
FIG. 1 illustrates example components of a system for passing messages to subscribers in various regions.

FIG. 1 depicts one or more embodiments of various components of a system 100, communicating on a network, to pass data among multiple client devices, and which may be used to accomplish the embodiments described below. The system as shown may be considered to be a cloud computing system, as the system includes multiple data centers that are accessible to remote client devices via a network. For example, the system 100 may be configured to share information among publishers and subscribers over the network. The system 100 includes a data center 106 across which data is transferred via the network from one or more publishers, such as publishers 101 and 102, to one or more subscriber client devices, such as subscribers 121 and 122. The term "publisher" refers to a device or system that directly or indirectly sends messages to a cloud computing system. The term "subscriber" refers to a device or system that is receiving messages from the data center. Data center 106 may replicate publishers' messages to any number of other, geographically distributed data centers (such as data center 108) to reach other subscribers (such as subscriber 123) that are closer to those other data centers. Similarly, the first data center 106 may receive replicated messages from any other data center 108 to the extent that the other data center 108 received the messages from nearby publishers (such as publisher 103). The first data center may then transmit those messages to its proximate subscribers 121 and 122.

Any subscriber may be configured to subscribe to a category of messages (such as messages from a particular publisher, or messages that a publisher has grouped—such as a stream of messages of a video broadcast—by subscribing to a channel monitored by the data centers 106, 108. A channel is a named destination (such as a subscriber node or other data stream) to which publisher clients publish messages, and from which subscribers receive messages. The channel is a data stream, such as a stream of messages, that is separately identifiable from other channels. A channel may be published and/or subscribed to. In some embodiments, a channel is a virtual concept characterized metadata included in messages. In some embodiments, a channel corresponds to a physical device, such as an I/O port, radio frequency tuner setting, a port associated with an Internet Protocol (IP) address, a specific fiber optic or electronic communication path, a specific sending or receiving device, and/or the like. A channel may be characterized by both virtual and physical attributes. A message is considered published to a channel when the message is assigned metadata that characterizes the massage as being part of that channel. A message may be assigned to more than one channel. A device can subscribe to one or more channels such that messages assigned to the subscribed channels are delivered to the subscribed device. Multiple channels may be subscribed to at the same time. Any number of subscribers may subscribe to a channel that publishes messages. A channel may be characterized by a source or a destination. Each channel may be associated with a source and/or category or topic. For example, in the context of a distributed gaming system, a subscriber may subscribe to one or more player channels, including his/her own channel, or the channel(s) of other player(s).

The data centers 106, 108 may receive messages from clients who are publishers 101, 102, and 103, and may filter the messages to the respective channels. The data centers may identify the channels to which messages are assigned by any suitable method. For example, the data may apply a rule set to assign to a particular channel all messages received from a particular address or publisher. Or, the data center may assign a message to a channel by applying a rule set to content in the message, in the message's header, or in metadata associated with other messages that accompany the first message.

When the data centers 106, 108 automatically publish data updates to clients who are subscribers 121, 122, 123 to a data service, the publication may occur via one or more of the channels. Then, when the data center 106 or 108 receives updated message objects and the updates correspond to any of the subscriber's channels, the subscriber may receive updates to those objects so that the subscriber has the latest data corresponding to the subscriber's channels. Any number of subscribers may subscribe to a channel that publishes messages concerning the data source and/or data topic. Each authorized subscriber will hold a subscribe key (sometimes referred to below as a tenant identifier), which is an application or a component of an application that provides access to published data. In one or more cases, each data center may relay and/or receive data updates from other data centers to help quickly replicate data updates across the network as in a mesh communication system. Optionally, some or all data centers may transmit data to non-subscribing user clients upon request from the client.

Figure 2:
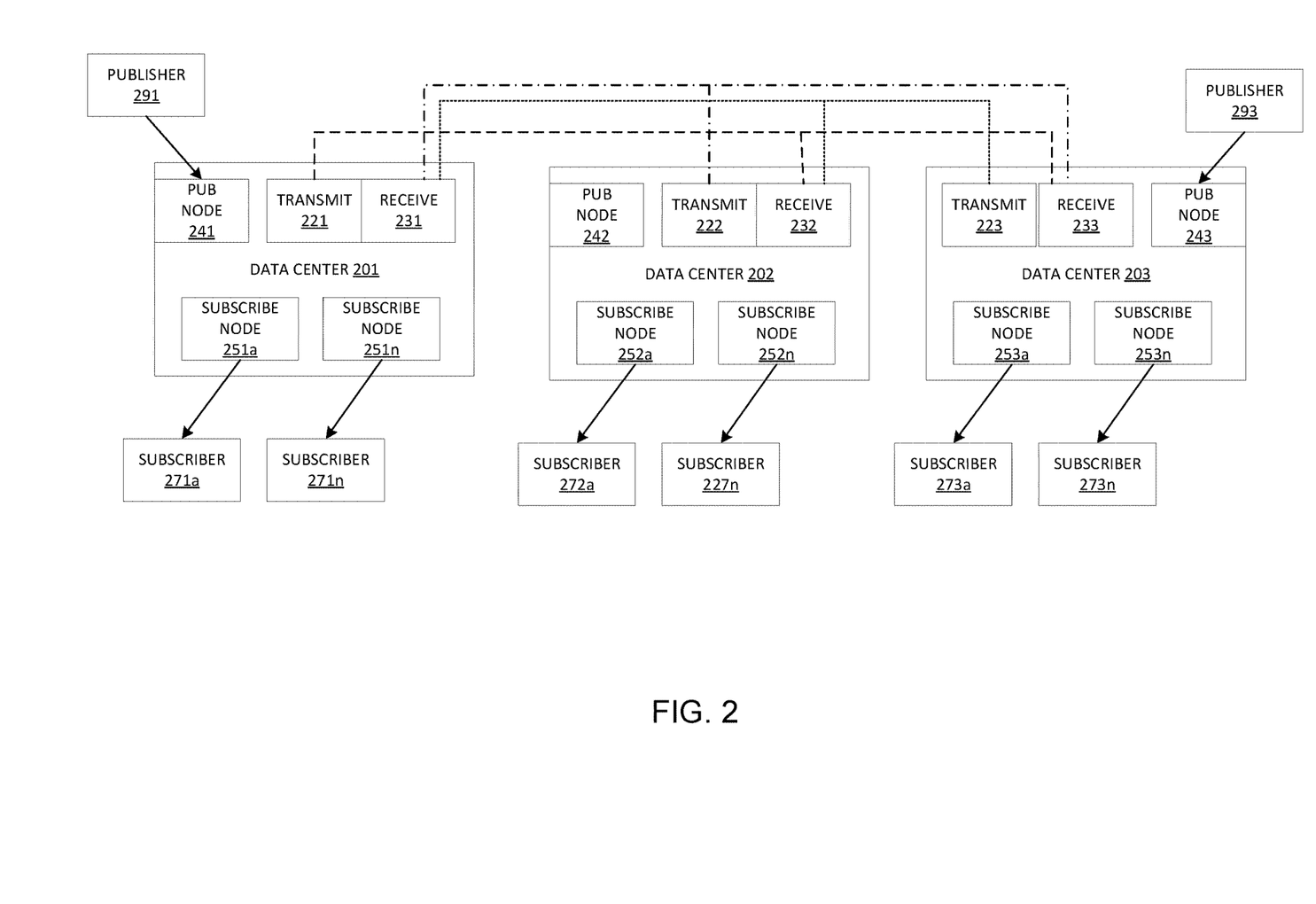
FIG. 2 illustrates how data centers in multiple regions may receive messages from publishers, replicate the messages among the data centers, and share the messages with local subscribers.

FIG. 2 illustrates that multiple data centers 201, 201, 203 located in different geographic regions and/or jurisdictions may be communicatively connected with each other. These data centers are communicatively connected to each other, either directly or indirectly via one or more data connections. Each data center 201, 201, 203 may include various "nodes," which in this document refers to a process residing on one or more computing devices containing a processor and/or computer-readable memory, along with programming instructions and/or data. Each data center 201, 201, 203 includes a receiver that serves as a replication receive node 231, 232, 233 and transmitter that serves as a replication transmit node 241, 242, 243. As shown in FIG. 2, each data center's transmit node is communicatively connected with the other data centers' replication receive nodes through one or more communication networks. Any number of data centers may be connected together, and the embodiments are not limited in this regard.

When a publisher publishes messages to any data center (such as publisher 291 to data center 201, or publisher 293 to data center 203), the applicable data center will receive the messages via a receiver that serves as a publication receive node 241, 242, 243. The data center will identify one or more channels via which the message will be published. The data center will associate an identified channel with each message when saving the message. For example, the data center may save an identifier for the associated channel with each data element. Additional details of message channel association processes are disclosed in U.S. Pat. No. 9,955,444 to Blum et al., the disclosure of which is fully incorporated into this document by reference. Alternatively or in addition, the system may segregate data elements by channel in the memory, such as by saving one channel's messages in a first memory sector and a different channel's messages in a different memory sector.

Each data center will then replicate its connected publishers' messages to the other data centers. Subscribers may then access the saved messages by subscribing to a subscriber channel (i.e., a subscriber node) and then using their tenant identifiers to connect to the appropriate channel at their nearest available data center. For example: subscribers 271a, 271n may access channels 251a, 251n at data center 201; subscribers 272a, 272n may access channels 252a, 252n at data center 202; and subscribers 273a, 273n may access channels 253a, 253n at data center 203. In this example, any number of channels may be available, and the channels are replicated among the data centers. (For example, channels 251a, 252a and 253a may contain common data sets.) A subscriber client may connect to a channel (i.e., a subscriber node) using any now or hereafter known protocol. For example, the subscriber node may allow a long-lived connection such as long-polling, COMET, WebSockets, SPDY, BOSH, or other techniques.

As noted above, the replication of all data in all data centers requires substantial data storage infrastructure. Also, the laws of a data center's jurisdiction may not allow certain types of data to be distributed outside of the jurisdiction. To resolve this, this document proposes a limited replication process in which messages are only replicated to data centers that are located in regions in which subscribers to those messages are located at the time. (As used in this document, the word "only" is not a strict requirement. Some messages may be replicated to regions without relevant subscribers so long as the process described below is used to remove at least some of the messages from replication to regions in which the messages are not needed.)

Figure 3:
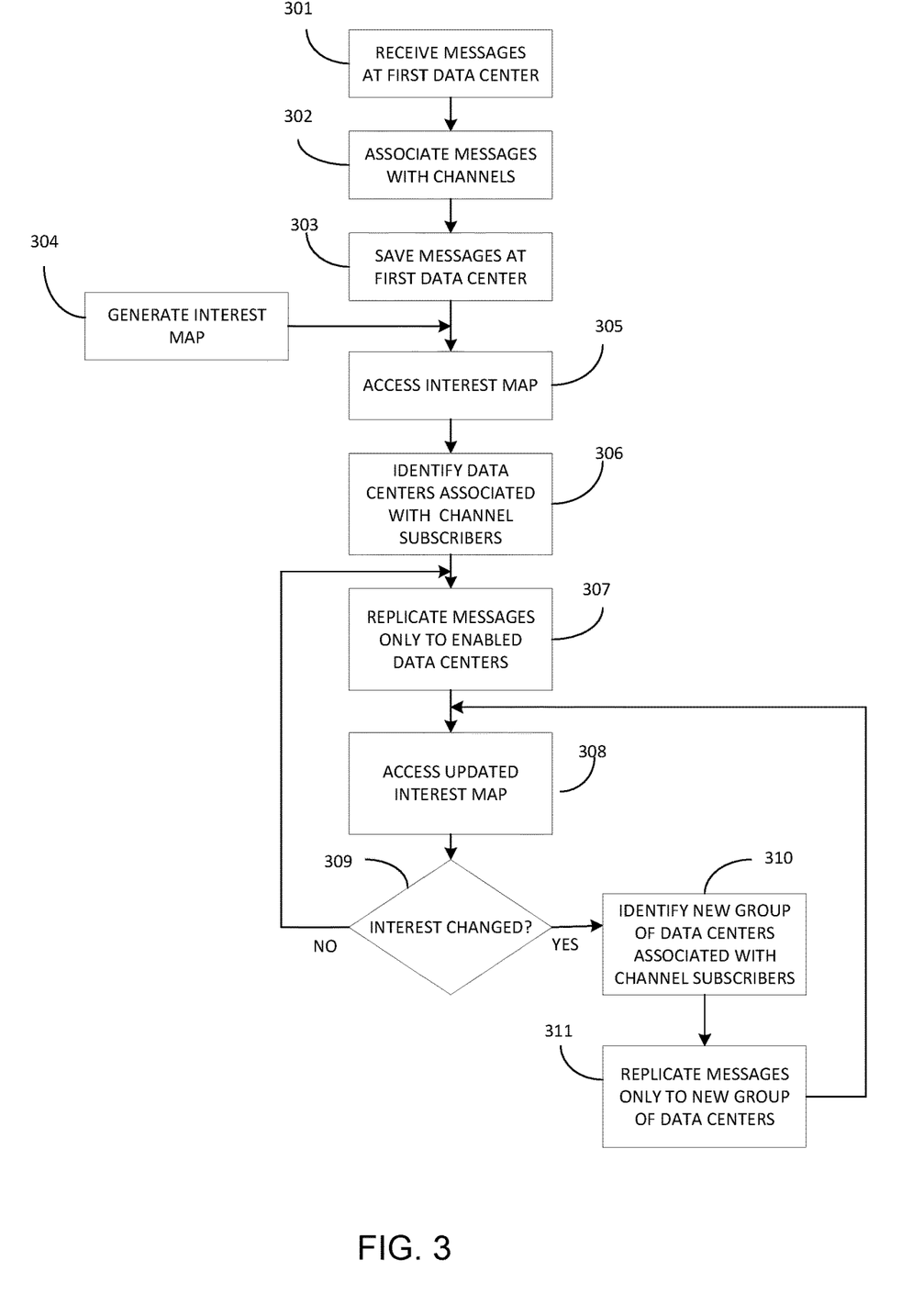
FIG. 3 illustrates a process for selective multi-region replication of messages in a message distribution system.

A method of providing selective replication of messages to multiple data centers in multiple geographic regions is now described with reference to FIG. 3. When any data center of a cloud-based message distribution system receives messages from a publisher (step 301) and the messages are to be published to multiple subscribers, the data center will determine the channel on which each message is to be published (step 302). As noted above, channel determination may be competed using by applying one or more rules, such as to assign all messages received from a particular address or publisher to that publisher's channel, or to semantically analyze content of the message or message header to identify words that are associated with a category and then assigning the message to a channel for that category. The data center will save messages in a data collection at the first data center along with, for each message, an association for the determined channel on which the message is to be published (step 303).

The data center will perform a limited replication process for data in the first channel by: (i) accessing an interest map indicating data centers with which subscribers of the channel are associated (step 305); (ii) identifying those data centers that are enabled for subscribers of the channel as indicated by the interest map (step 306); and (iii) transmitting the saved messages that are associated with the first channel to the group of enabled data centers for replication, but not to other data centers from which no subscribers have expressed interest (step 307). The interest map may contain a set of enabled datacenters for any given tenant. In this document the term "tenant" refers to the bearer of a tenant identifier (e.g., a subscriber or group of subscribers).

Figure 4:
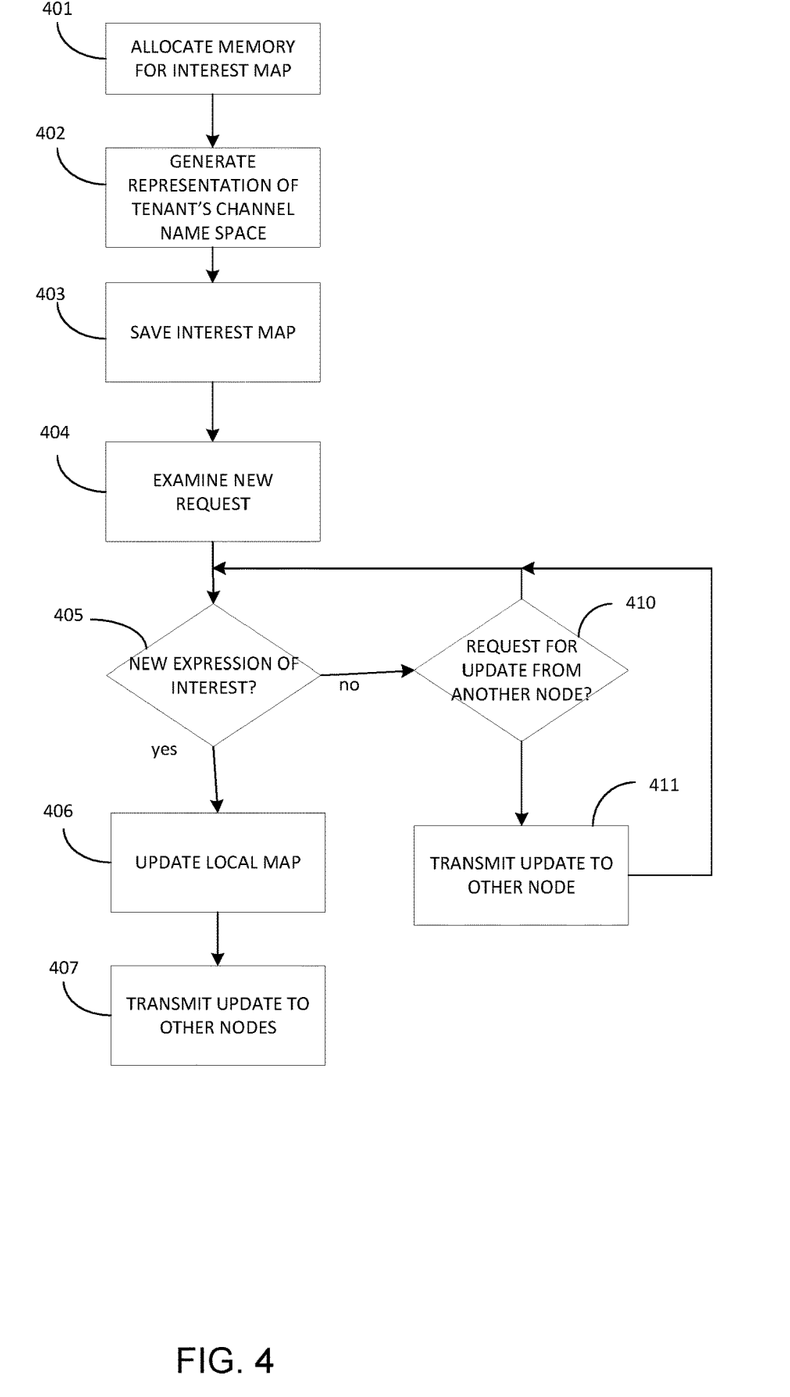
FIG. 4 illustrates an example process of generating and updating an interest map.

An interest map is a data set that identifies associations between channel subscriber locations and enabled data centers. An example method of generating an interest map (step 304) is illustrated in FIG. 4. Referring to FIG. 4, the system may allocate initial memory in the form of an array of bits per tenant key per destination. For each subkey/tenant, the system may maintain an enabled datacenters attribute. Interest maps may be generated by combining the tenant's identifier string and the data stream channel name string. The generator will concatenate these two strings in memory before proceeding. This may yield a hashed or compressed representation of the tenant's channel name space (step 402). The use of a channel name allows tenants to express interest in wildcard channel names. (A wildcard channel name matches hierarchies of fully qualified channel names. The result may be saved to the memory segment to form part of the interest map (step 403).

This memory segment is then converted to a 64-bit (or other sized) integer by a left bit shift using character code values from the concatenated string segment and modulating each character code by a prime number pre-identified by the key and channel character length average to produce low chance collision resultant integer value producing an identified ordinal position in each interest bitmap of a predetermined size coordinating the channel cardinality per tenant identifier data center. The resulting bitmap diff is transmitted to data center replication workers to be appended/added to a continuously updating maps of interest globally. The bitmap size may be calculated (for example, as a per-tenant median regional residency of the channel cardinality at a minimum floor bit value of 1 bit) to determine optimal interest map size (bit depth) and time to live (TTL) configuration for each tenant identifier. This equation is biased towards channel cardinality residency. Alternatively, the bitmap size may be manually set. Other interest representations, such as Bloom filters, may be used in various embodiments, so long as the interest representation distinguishes between "no recorded interest" and "at least some recorded interest" for each available data center.

Figure 5A:
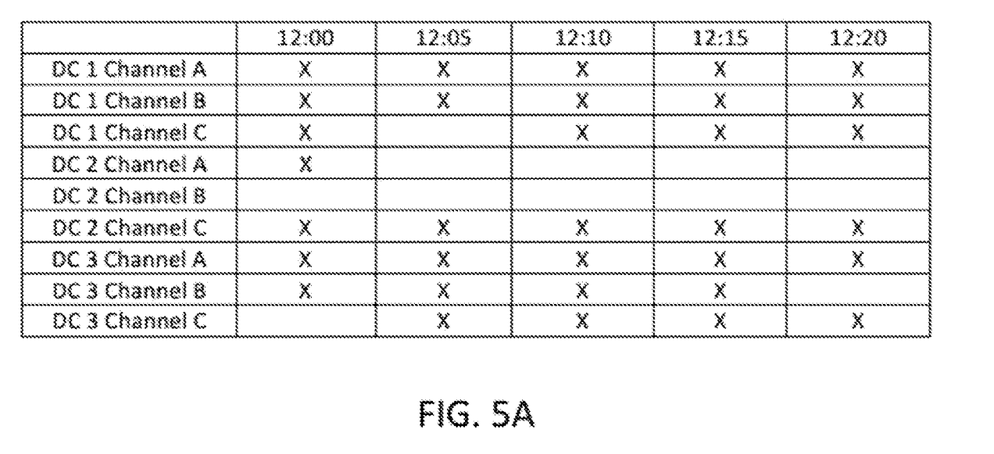
FIGS. 5A and 5B illustrate a simple form of an example interest map.
Figure 5B:
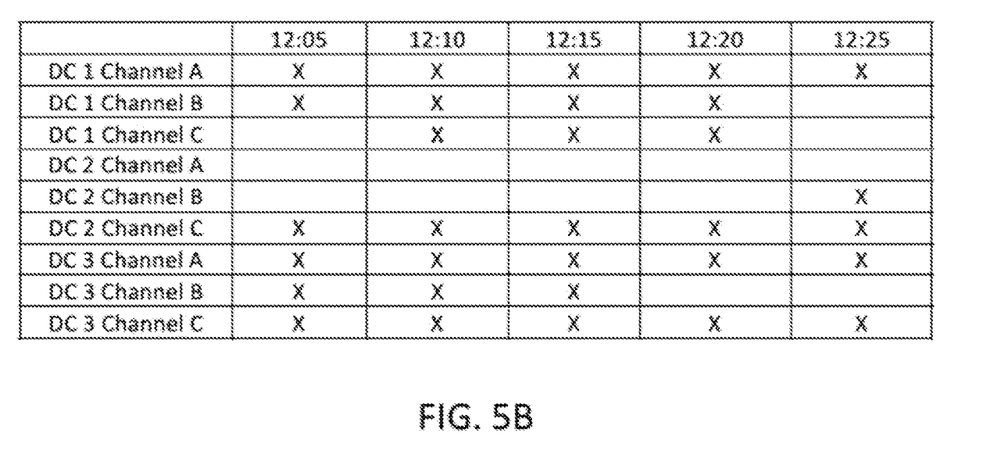

The data set of the interest map will have at least two dimensions. One dimension is the hashed or compressed representation of the tenant's channel name space (as determined in step 402). The second dimension is a time series. An example of this is shown in FIG. 5A, in which the representations of possible channel name spaces appear on the Y-axis, and times appear on the X-axis. In the example FIG. 5A, in the map's time period tenants have expressed interest for all channel name spaces except that of Data Center 2, Channel B. Thus, the publishing nodes will replicate the data for Channels A and C to all three Data Centers, and it will replicate the data for Channel B only to Data Centers 1 and 3. The time series is used because interest in particular channel at a given data center may come and go over time. To periodically expire recorded interest, the time of most recent interest will be associated with the recorded interest. Rather than record the time of most recent interest per specific channel name has, the system may shift the entire interest map one time step (i.e., one column of the array) along the time series dimension. This is illustrated in FIG. 5B, in which the time steps are spaced 5 minutes apart, and the interest map is shifted left to allow for a new time series of data (12:25), while the earliest time series of data (12:00) drops off the map. With this shift, the new time series shows that interest is expressed at Data Center 2 for Channel B, so the system will now replicate the data for Channel B to all three Data Centers (including Data Center 2). However, there is now no expressed interest for Channel A at Data Center 2, so the system will stop replicating data for Channel A to Data Center 2 until interest again appears in a future time series. Optionally, the system may also reserve an empty set as a most recent time series entry. This set will remain empty until interest is expressed for any particular channel/data center combination. Also optionally, a tenant's interest map size may change during operation.

Receiving nodes will examine incoming subscribe requests and extract all channel names in the subscribe request (step 404). For each channel name, the receiving node may check whether interest was previously recorded in the most recent time series of the node's local interest map (step 405). If no interest was previously recorded during the time period of the local interest map, then the mode may record interest locally in the most recent time series of its local interest map (step 406). In addition, the node may queue an interest notification to be sent to other parts of the system (step 408), so that all interest maps are updated and synchronized with each other.

Optionally, when a node comes online, either for the first time or after a period of being offline, or when a node fails to receive any updates for a threshold period of time, it may request interest map data from another transmitting node (step 410). If so, then at step 411 the other node may transmit its entire interest map to the requesting node, or it may transmit a subset of the map (such as the most recent time series), which will become the most recent time series entry in the requesting node's interest map.

Optionally, if a transmitting node newly learns of a tenant and does not have interest maps for that tenant, it may attempt to acquire interest maps from a nearby transmitting node. If no such interest maps are available, then the transmitting node may err on the side of over-replication (i.e., replicating data to all nodes) until interest maps are built from incremental interest notifications received by the transmitting node.

Optionally, transmitting nodes may cache copies of recently published messages for a period of time. If so, then newly learned interest from incremental interest notifications arriving after the initial publish time may expand the local interest map. Optionally, this may lead to additional (belated) replication of cached messages to those data centers that are newly registering interest.

If a receiving node processes a subscribe request for which no current interest has been recorded, then there will be no such short-term cached message data. If so, the receiving node may optionally retrieve older messages from permanent storage and deliver those messages to the requesting client.

Returning to FIG. 3, when accessing the interest map (step 305), the system may thus be able to determine, for any channel, what data centers are associated with subscribers for that channel at any given time. "Associated" in this context means that tenants are currently expressing interest and/or have recently (as indicated by the time series of the interest map) expressed interest. When identifying the data centers that make data available to the locations indicated by the interest map (step 306), the system may thus identify those enabled data centers to which subscribers are actually connected or have very recently connected.

If a particular data center is not enabled for any subscribers to a particular channel, then other data centers need not replicate their data sets for that channel to that data center unless and until a subscriber associated with that data center expresses interest in the channel. To do this, an interest map is held in a replication portion of publish/transmit worker processes within the data center to indicate interest of subscriptions in each data center. When an interest is expressed, the interest map is updated in each data center allowing the decisions of replication a time of message publish. This is indicated by the change shown in FIGS. 5A and 5B. When the resulting ordinal is not present in the interest bitmap, replication of this message may be skipped.

When the first data center identifies the other data centers that should receive updates for a channel, it will send its updates (which may include only the updated data, or which may include a full data set) to the group of additional data centers for replication, but not to other data centers that do not make data available to the locations indicated by the interest map (step 307). The system may do this in any number of possible ways, such as via direct messages to addresses associated only with data centers to which replication is directed, or via a broadcast with an identifier that potentially receiving data centers will analyze to determine whether the update is intended for them.

To maintain current data sets in locations where needed, the system will periodically update the interest map (step 308) and, when doing so, it will determine whether the subscriber interest from any data center for a given channel has changed (step 309). Interest is expressed by a subscriber when the subscriber subscribes to a particular channel. If an update identifies a data center for which interest has changed from a prior version of the interest map (step 309: YES), the system will identify an updated group of enabled data centers that should receive updates to that channel (step 310). It may then optionally transmit the saved messages that are associated with that first channel to the new group of data centers (step 311). For example, if in step 310 the system identifies at least one new additional data center from which a subscriber of the channel expressed interest in the update but from which no subscriber of the channel expressed interest in the prior version, the system will add that data center to group that will receive updates. On the other hand, if at step 310 an update identifies that a data center that was enabled in the prior version no longer has any interested subscribers, the system will exclude that data center from future replications until a subscriber expresses interest in the future.

Whenever a receiving node detects new or renewed interest, it will send interest notifications to other parts of the system, such as transmitting nodes (i.e., those sending data from publishers). Transmitting nodes may build interest maps in real time, representing which data centers have seen interest in any given channels, optionally separated by tenant.

The system may implement the process above for any number of tenant keys, any number of tenants' channels, and any number of data centers.

Each interest map is set to rotate and expire per tenant. The period to expiration may be labeled as the TTL interval period. After the last subscriber to a channel disconnects from that channel in a data center, interest notifications discontinue propagation. The TTL timer begins and restarts each interest map diff update. Consider when tenant configuration Interest Map TTL is set to 100 seconds. A channel's interest would be dropped after 3×100=300 seconds (5 min) in this example. To prevent a possible loss of messages on the initial migration of a tenant when enabling selective replication prior to the interest map being built, proactive replication of message data may be performed globally to all data centers, subject to configured enabled datacenter limitations such as a maximum spread for a given key. The initial channel mapping/tracking process may then be decoupled from enforcing the selective replication of messages during this warm-up phase. Per-tenant TTL configuration may be used in a multi tenant infrastructure, as each tenant has non-homogeneous use cases with various traffic patterns and channel topologies. Tenants may have high channel cardinality and may churn channels rapidly. Other tenants have common channel names in use regularly over long periods of time. This TTL configuration defines the delay for announcing a channel interest for each subscription. The interest map sender and receiver align for coordination of the TTL allowing the rotation and expiration of Interest Maps. The TTL is optimally observed by the tenant's lifetime usage of each channel. There is a floor and ceiling where bandwidth requirements will invert and require greater bandwidth usage dependent on the utility and lifetime usage of a channel.

The subscriber nodes of each data center may include data collection caches where messages are temporarily stored for a determined duration. The duration may be set by a rule such as a particular time period after receipt by the subscriber node, or if no subscriber has accessed the message after a particular period of elapsed time. To assist with this process, the subscriber node's data center may assign one or more time tokens to each message. A time token may include any number of digits, characters or other identifiers that identify a particular time of receipt. In some embodiments, the time of a time token may be that with respect to a universal benchmark that applies regardless of the region in which the data center is located, such as Coordinated Universal Time (UTC). A time token may indicate when the data center received the message. Other time tokens may indicate when the message was last accessed by a subscriber. The data collection caches of subscriber nodes are only intended for short term storage, and messages may be regularly purged after time tokens expire.

Optionally, any data center also may include to be communicatively connected to an archive that stores messages for a relatively longer period of time than will the data collection caches. The archive may be used to store messages that are intended to remain available beyond the time provided by the data collection caches, or to serve as a backup, or to serve as a repository for any data center to receive updates for a channel after a period of time has passed in which it received no updates because it had no connected subscribers for the channel.

Optionally, in some embodiments the system may perform a chatter reduction process when performing selective replication of messages. Chatter reduction is a process of combining tenant-wide interest map updates into the same sequence of Ethernet frames replicated to other data centers allowing for fewer network packets transmitted at a lower maximum emission frequency. The protocol of interest map propagation allows for multiple tenant channel interests to be combined into an array of interest diffs replicated with each foreign data center configured per tenant identifier. The system may employ a default or threshold ceiling emission frequency, for example a maximum of ten emission sequences per second. This is tunable by tenant population emission frequency requirement governed by bit depth of interest maps globally. This accomplishes a benefit of preventing too many sequence breaks between interest map updates for high channel cardinality and low channel lifetime utility scenarios. This improves the efficiency of selective replication reducing the bandwidth requirement for multi tenant non-homogenous use case patterns.

Optionally, before replicating messages to data centers, the system also may determine a subset of the tenant keys that are candidates for replication, and only replicate data to the data centers that are associated with eligible keys. To determine whether a candidate is eligible, it may score or rank various tenants higher or lower than others based on any number of factors. For example, tenants who centralize traffic to a single geographic region may rank relatively higher as candidates for region-only selective replication, as the majority of the network traffic needs are met locally and off-shore replication can be suppressed. Tenants who are global with connectivity to multiple regions (or all regions) may be more highly ranked as candidates for channel-level selective replication than tenants who only connect to relative few regions. Also, because interest map notifications consume bandwidth, the system may require tenant keys to meet usage level thresholds before replicating data to data centers associated with those case. For example, if map notifications consume bandwidth at a rate of at least 160 kilobytes (KB) per hour, the system may require channel cardinality in one or more regions to be low and the usage of those channels exceed the 160 KB per hour per channel before it will replicates data to that region or channel. If this requirement is met, then net bandwidth savings may be achieved.

Optionally, before replicating a full set of messages to another data center, the first data center may determine whether any message is not eligible for replication. It may do this based on the metadata or other data contained within the message, such as a type of message, a publisher identifier, an indication of whether the publisher has subscribed to a data service, or some other data. Alternatively, if the system designates some channels as eligible for replication and other channels as not eligible for replication, the system may determine that a message is eligible for replication only if the message was received on a channel that is designated for such replication. If a message is not eligible for replication, the receiving data center may simply store it and broadcast it on one or more of its local subscriber channels without replicating that message to the other data centers' data collections.

Figure 6:
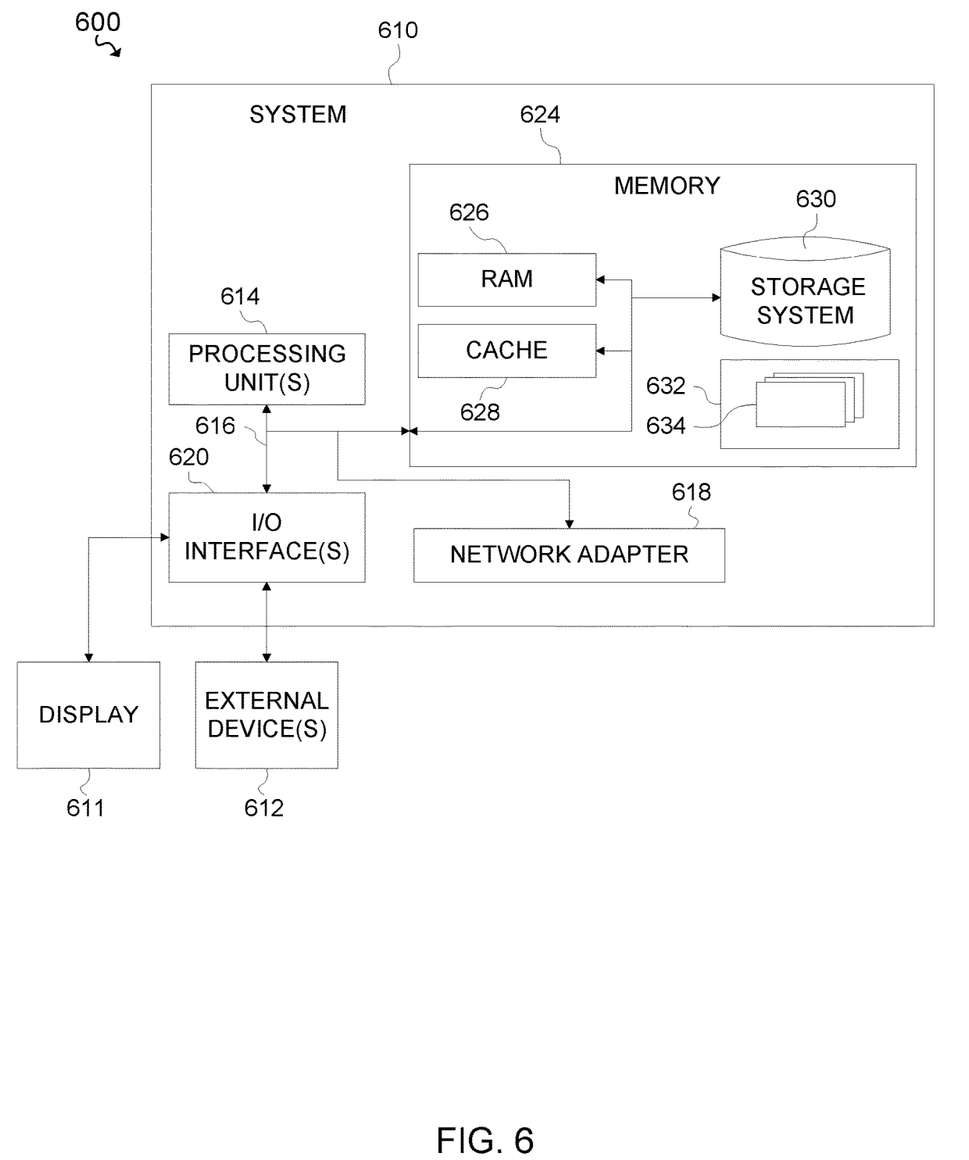
FIG. 6 illustrates example components of electronic devices that may be used with various aspects of the invention as described below.

Also optionally, a customer may restrict data centers enabled to only those which comply with all data transfer and data storage restriction requirements. For example, referring again to FIG. 3, before transmitting messages to another node at step 307 or 310, the transmitting node may first determine whether a regional restriction prohibits transmission of a channel's data to the other node. If so, then even if an interest map indicates that certain data should be replicated to a particular data center, such a rule of restriction may override the interest map and restrict certain data from being transmitted to one or more locations. FIG. 6 is a block diagram depicting various hardware components that may be part of a web service provider's electronic device or any client electronic device. For example, any of the devices shown in FIG. 1 may include similar internal hardware architecture such as that illustrated in FIG. 6. FIG. 6 provides only an illustration of one implementation and does not imply any limitations with regard to the environments in different embodiments that may be implemented. Many modifications to the depicted environment may be made.

In one or more cases, the devices in FIG. 1 are in the form of computing electronic devices, such as computer system 610. The components of the computer system 610 may include, but are not limited to, one or more processors or processing unit 614, a memory 624, and a bus 616 that couples various system components including the memory 624 to the processing unit 614. For example, each of the data centers shown in FIG. 1 may include a processing unit 614 and a memory 624 that contains programming instructions that are configured to cause the processing unit to perform various functions.

The bus 616 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 610 typically includes a variety of computer system readable media. Such media may be any available media that is accessible by the computer system 610, and it includes both volatile and non-volatile media, removable and non-removable media.

The memory 624 can include computer system readable media in the form of volatile memory, such as random access memory (RAM) 626 and/or cache memory 628. The computer system 610 may further include other removable/non-removable, volatile/non-volatile computer system storage media. By way of example only, the storage system 630 can be provided for reading from and writing to a non-removable, non-volatile magnetic media (not shown, but examples are those typically called a hard drive or solid state drive). Although not shown, a magnetic disk drive for reading from and writing to a removable, non-volatile magnetic disk, and an optical disk drive for reading from or writing to a removable, non-volatile optical disk such as a CD-ROM, DVD-ROM, or other optical media can be provided. In such instances, each can be connected to the bus 616 by one or more data media interfaces. As will be further depicted and described below, the memory 624 may include at least one computer program product having a set (e.g., at least one) of program modules that are configured to carry out the functions of embodiments.

A program/utility 632, having one or more sets of program modules (i.e., programming instructions) 634, may be stored in the memory 624 by way of example, and not limitation, as well as an operating system, one or more application programs, other program modules, and program data. Each of the operating systems, one or more application programs, other program modules, and program data, or some combination thereof, may include an implementation of a networking environment. The program modules 634 generally carry out the functions and/or methodologies of embodiments as described in this document. The computer system 610 may also communicate with one or more external device(s) 612 such as a keyboard, a pointing device, a display 611, etc., or one or more devices that enable a user to interact with the computer system 610 and any devices (e.g., network card, modem, etc.) that enable the computer system 610 to communicate with one or more other computing devices. Such communication can occur via Input/Output (I/O) interface(s) 620. Still yet, the computer system 610 can communicate with one or more networks such as a local area network (LAN), a general wide area network (WAN), a cellular telephone data network, and/or a public network (e.g., the Internet) via a network adapter 618. As depicted, the network adapter 618 communicates with the other components of the computer system 610 via the bus 616. It should be understood that although not shown, other hardware and software components, such as microcode, device drivers, redundant processing units, external disk drive arrays, redundant array of independent disk (RAID) systems, tape drives, and data archival storage systems may be used in conjunction with the computer system 610.

The embodiments described in the present disclosure may relate to a system, a method, and/or a computer program product. The computer program product may include a computer readable storage medium (or media) having computer readable program instructions for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this document can be downloaded to respective computing/processing devices from a non-transitory computer readable storage medium or to an external computer or external storage device via a network, for example, the Internet, a local area network, a wide area network, a cellular telephone data network, and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described in this document with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

Terminology that is relevant to this disclosure includes:

In this document, when terms such "first" and "second" are used to modify a noun (such as a data center), such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document, the terms "connected" and "communicatively connected", when referring to two items that convey data between each other, means that a communication path exists between the two components. The path may be a direct path (such as a wired or wireless transmission) or an indirect path through one or more intermediary components such as intermediary networks.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 6.

The terms "processor," "processing unit" and "processing device" refer to a hardware component of an electronic device that is configured to execute programming instructions. Except where specifically stated otherwise, the singular terms "processor," "processing unit" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of distributing messages to subscribers that are located in multiple regions, the method comprising, by a first data center of a cloud computing system:
receiving messages that are to be published to a plurality of subscribers;
saving the messages in a data collection at the first data center; and
performing a limited replication process by:
accessing an interest map indicating data centers with which the subscribers are associated, and
transmitting the saved messages to the data centers with which the subscribers are associated as indicated by the interest map for replication, and not to other data centers that are not indicated by the interest map as being associated with the subscribers.

2. The method of claim 1, further comprising:
periodically updating the interest map; and
for each update in which one or more associations between subscribers and associated data centers have changed from a prior version of the interest map:
identifying a new additional data center with which a subscriber has associated in the update but to which no subscriber was connected in the prior version, and
transmitting the saved messages to the new additional data center.

3. The method of claim 1, further comprising:
periodically updating the interest map; and
for each update in which one or more associations between subscribers and data centers have changed from a prior version of the interest map:
identifying a data center with which a subscriber was associated in the prior version but with which no subscriber is associated in the update, and
thereafter, when transmitting the saved messages to the data centers with which the subscribers are associated for replication, excluding the identified data center from the replication.

4. The method of claim 1 further comprising, by the first data center, performing the limited replication process for each channel of a plurality of channels.

5. The method of claim 1, further comprising generating the interest map as an array comprising, for each of a plurality of time periods, an indication of whether interest has been expressed by one or more of the subscribers in each time period.

6. The method of claim 5 comprising, for each new time period, adding a new set of time series data to the interest map for the new time period and removing an oldest set of time series data from the interest map.

7. The method of claim 5, wherein the indication comprises a hashed or compressed representation of a tenant's channel name space.

8. The method of claim 1 further comprising:
receiving a request for interest map data from another data center; and
transmitting a portion of the interest map to the other data center.

9. The method of claim 1 further comprising, when transmitting the saved messages, performing a chatter reduction process that combines entries from multiple interest maps into a single Ethernet frame.

10. The method of claim 1 wherein the limited replication process further comprises, before transmitting the saved messages:
identifying whether any of the data centers with which subscribers for the first channel are associated are data centers that are subject to a regional restriction; and
when transmitting the saved messages, only doing so to data centers that are not subject to the regional restriction.

11. A system for distributing messages to subscribers that are located in multiple regions, the system comprising:
a first data center comprising a first processing unit and a first computer-readable medium containing programming instructions that are configured to cause the first processing unit to:
receive messages that are to be published to a plurality of subscribers,
save the messages in a data store at the first data center; and
perform a limited replication process by:
accessing an interest map indicating data centers with which the subscribers are associated, and
transmitting the saved messages to the data centers with which the subscribers are associated as indicated by the interest map for replication, and not to other data centers that are not indicated by the interest map as being associated with the subscribers.

12. The system of claim 11, further comprising additional programming instructions that are configured to cause the first processing unit to:
periodically update the interest map; and
for each update in which one or more associations between subscribers and associated data centers have changed from a prior version of the interest map:
identify a new additional data center with which a subscriber has associated in the update but to which no subscriber was connected in the prior version, and
transmit the saved messages to the new additional data center.

13. The system of claim 11, further comprising additional programming instructions that are configured to cause the first processing unit to:
periodically update the interest map; and
for each update in which one or more associations between subscribers and data centers have changed from a prior version of the interest map:
identify a data center with which a subscriber was associated in the prior version but with which no subscriber is associated in the update, and
thereafter, when transmitting the saved messages to the data centers with which the subscribers are associated for replication, exclude the identified data center from the replication.

14. The system of claim 11 further comprising additional programming instructions that are configured to cause the first processing unit to perform the limited replication process for each channel of a plurality of channels.

15. The system of claim 11, further comprising additional programming instructions that are configured to cause the first processing unit to generate the interest map as an array comprising, for each of a plurality of time periods, an indication of whether interest has been expressed by one or more of the subscribers in each time period.

16. The system of claim 15, further comprising additional programming instructions that are configured to cause the first processing unit to, for each new time period, add a new set of time series data to the interest map for the new time period and remove an oldest set of time series data from the interest map.

17. The system of claim 15, wherein the indication comprises a hashed or compressed representation of a tenant's channel name space.

18. The system of claim 11 further comprising additional programming instructions that are configured to cause the first processing unit to:
   receive a request for interest map data from a second data center; and
   transmit a portion of the interest map to the second data center.

19. The system of claim 11, further comprising additional programming instructions that are configured to cause the first processing unit to, when transmitting the saved messages, perform a chatter reduction process that combines entries from multiple interest maps into a single Ethernet frame.

20. The system of claim 11, wherein the programming instructions to perform the limited replication process further comprise instructions to cause the first processing unit to, before transmitting the saved messages:
   identify whether any of the data centers with which subscribers are associated are data centers that are subject to a regional restriction; and
   when transmitting the saved messages, only do so to data centers that are not subject to the regional restriction.

* * * * *